(12) United States Patent
Secatch et al.

(10) Patent No.: US 11,829,270 B2
(45) Date of Patent: Nov. 28, 2023

(54) SEMICONDUCTOR DIE FAILURE RECOVERY IN A DATA STORAGE DEVICE

(71) Applicant: Seagate Technology LLC, Fremont, CA (US)

(72) Inventors: Stacey Secatch, Niwot, CO (US); Stephen H. Perlmutter, Louisville, CO (US); Matthew Stoering, Shakopee, MN (US); Jonathan Henze, Savage, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/516,072

(22) Filed: Nov. 1, 2021

(65) Prior Publication Data

US 2022/0138065 A1    May 5, 2022

Related U.S. Application Data

(60) Provisional application No. 63/107,518, filed on Oct. 30, 2020.

(51) Int. Cl.
| | |
|---|---|
| G06F 11/00 | (2006.01) |
| G06F 11/20 | (2006.01) |
| G06F 11/10 | (2006.01) |
| G06F 3/06  | (2006.01) |

(52) U.S. Cl.
CPC ........ *G06F 11/2094* (2013.01); *G06F 3/0619* (2013.01); *G06F 3/0652* (2013.01); *G06F 3/0656* (2013.01); *G06F 3/0659* (2013.01); *G06F 3/0679* (2013.01); *G06F 11/1004* (2013.01)

(58) Field of Classification Search
CPC ......................... G06F 11/2094; G06F 11/1004
See application file for complete search history.

(56) References Cited

U.S. PATENT DOCUMENTS

| | | | |
|---|---|---|---|
| 2014/0157085 A1* | 6/2014 | Shalvi | G06F 11/108 714/768 |
| 2022/0138065 A1* | 5/2022 | Secatch | G06F 11/0751 714/6.12 |

* cited by examiner

*Primary Examiner* — Philip Guyton
(74) *Attorney, Agent, or Firm* — Hall Estill Law Firm (57) ABSTRACT

Apparatus and method for a die kill and recovery sequence for a non-volatile memory (NVM). Data are stored in the NVM as data sets in garbage collection units (GCUs) that span multiple semiconductor dies. A die failure management circuit is configured to detect a die failure event associated with a selected die, and to generate a recovery strategy to accommodate the detected die failure event by selecting recovery actions to be taken in a selected sequence to maintain a current level of data transfer performance with a client device. The selected recovery actions are carried out in the selected sequence to transfer at least a portion of the user data stored in the selected die to a new replacement die, after which the selected die is decommissioned from further use. The NVM may be a flash memory of a solid-state drive (SSD).

20 Claims, 5 Drawing Sheets

DATA FLOW

FIG. 5

METADATA (MAP) FORMAT

SEMICONDUCTOR DIE FAILURE RECOVERY IN A DATA STORAGE DEVICE

RELATED APPLICATIONS

This application makes a claim of domestic priority under 35 U.S.C. 119(e) to U.S. Provisional Patent Application No. 63/107,518 filed Oct. 30, 2020, the contents of which are hereby incorporated by reference.

SUMMARY

Various embodiments of the present disclosure are generally directed to the management of semiconductor die failures in a non-volatile memory (NVM), such as but not limited to a solid-state drive (SSD).

In some embodiments, a die kill and recovery sequence is provided for the NVM. Data are stored in the NVM as data sets in garbage collection units (GCUs) that span multiple semiconductor dies. A die failure management circuit is configured to detect a die failure event associated with a selected die, and to generate a recovery strategy to accommodate the detected die failure event by selecting recovery actions to be taken in a selected sequence to maintain a current level of data transfer performance with a client device. The selected recovery actions are carried out in the selected sequence to transfer at least a portion of the user data stored in the selected die to a new replacement die, after which the selected die is decommissioned from further use.

These and other features which may characterize various embodiments can be understood in view of the following detailed discussion and the accompanying drawings.

DETAILED DESCRIPTION

Solid state drives (SSDs) are data storage devices that store user data in non-volatile memory (NVM). A controller directs the transfer of user data between the NVM and a host (client) device. The NVM will usually be NAND flash memory, but other forms of solid-state memory can be used. The flash may be subdivided into garbage collection units (GCUs) which are allocated and erased as a unit.

The NVM may be arranged as a plurality of semiconductor dies, which are arranged in die groups each connected to a common channel. The GCUs may be spread across multiple sets of the dies and may include parity information to enable the data stored in parity sets to be recovered even in the event of a failure event, such as but not limited to the failure of a particular semiconductor die in the NVM array.

Various embodiments of the present disclosure are generally directed to a method and apparatus for recovering from a die failure in a semiconductor NVM, such as but not limited to a flash memory in a solid state drive (SSD).

As explained below, some embodiments arrange the NVM as a plurality of semiconductor dies. User data from a client device are stored as data sets in garbage collection units (GCUs) that span multiple ones of the semiconductor dies. The GCUs are allocated and erased as a unit.

A monitoring circuit operates to detect a pending die failure event associated with a selected one of the dies. In response, the monitoring circuit generates a recovery strategy to accommodate the detected die failure event. The recovery strategy is tailored to the then-existing conditions and recent historical operational characteristics of the device. The recovery strategy includes various recovery actions to be taken in a selected sequence to maintain a current level of data transfer performance with the client device.

The selected recovery actions are carried out in the selected sequence to transfer at least a portion of the user data stored in the selected die to a new replacement die within the NVM. Once the requisite data have been recovered, the selected die is decommissioned and removed from further service.

The recovery actions can take a variety of forms. Examples include, but are not limited to cancellation of a scheduled background operation upon the selected die, a garbage collection operation in which current version data in the selected die are copied to the new replacement die, allocating at least one buffer to support a data transfer operation with the selected die with the at least one buffer previously scheduled for use with a different die not associated with the selected die, and performing a read from cached data in a buffer memory to eliminate a need to perform a re-read of data from the selected die, and notification of a user associated with the selected die of the detected die failure event and prioritizing the reading of data from the selected die responsive to a priority ordering input supplied by the user. In some cases, raw data with code words can be used to separate host (client) reads from other background operations. Adaptive steps can be taken so that some operations can be ignored, skipped or reordered as required.

In this way, a system controller can engage in a variety of options to optimize recovery and maintain data storage performance. In severe failure conditions where little or no data can be retrieved from the failed die, the sequence can include reconstruction of the missing data using existing parity set techniques. As before, the data can be prioritized and recovered in an order that best supports existing and anticipated client needs.

Figure 1:
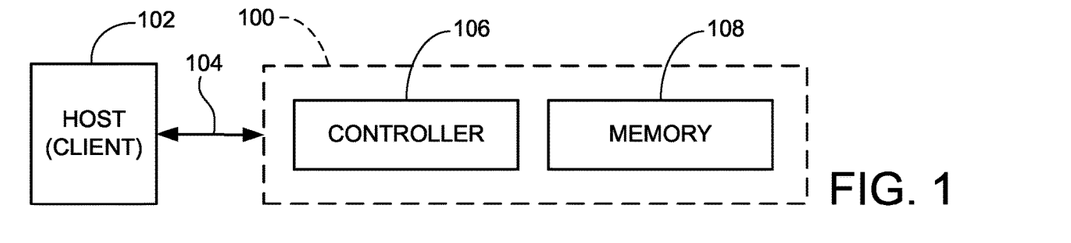
FIG. 1 provides a functional block representation of a data storage device constructed and operated in accordance with various embodiments.

These and other features and advantages of various embodiments can be understood beginning with a review of FIG. 1 which provides a functional block diagram of a data storage device 100. The device 100 is coupled to an external host (client) device 102 via a suitable client interface 104.

The client device 102 may take the form of a personal computer, a smart phone, a workstation, a tablet, a laptop, a gaming system, a microcontroller, a server, an edge device, an Internet of Things (IoT) device, etc. It is contemplated albeit not required that the client 102 is a user device accessed by a user. The interface 104 can take substantially any form including but not limited to a local wired or wireless interface, a local area network (LAN), a wide area network (WAN), a cloud computing interface, the Internet, etc.

The data storage device 100 is configured to store and retrieve data utilized by the user of the client device 102 and may be characterized as a local processing unit, a data cache, a server cache, a RAID storage system, a cloud storage system, a solid-state drive (SSD), a hard disc drive (HDD), a hybrid storage device, an array of storage devices, a portable thumb (e.g., USB) drive, etc. The data storage device 100 includes a controller 106 and a memory 108. The controller 106 can include one or more programmable processors that execute program instructions stored in a local memory to carry out various functions, including the control of data transfers between the memory 108 and the client 100 across the interface 102. As desired the controller 106 can additionally or alternatively be realized using hardware circuits, and can be incorporated into the memory unit 108.

The memory 108 can include any number of useful forms including local memory for the controller, cache memory, buffer, main storage, etc. While not limiting, it is contemplated that the memory 108 will include semiconductor memory to provide non-volatile memory (NVM) storage for data utilized or otherwise processed by the controller 106. As will be recognized, the term "non-volatile" describes a memory that continues to retain information stored therein even after the removal of applied power.

Figure 2:
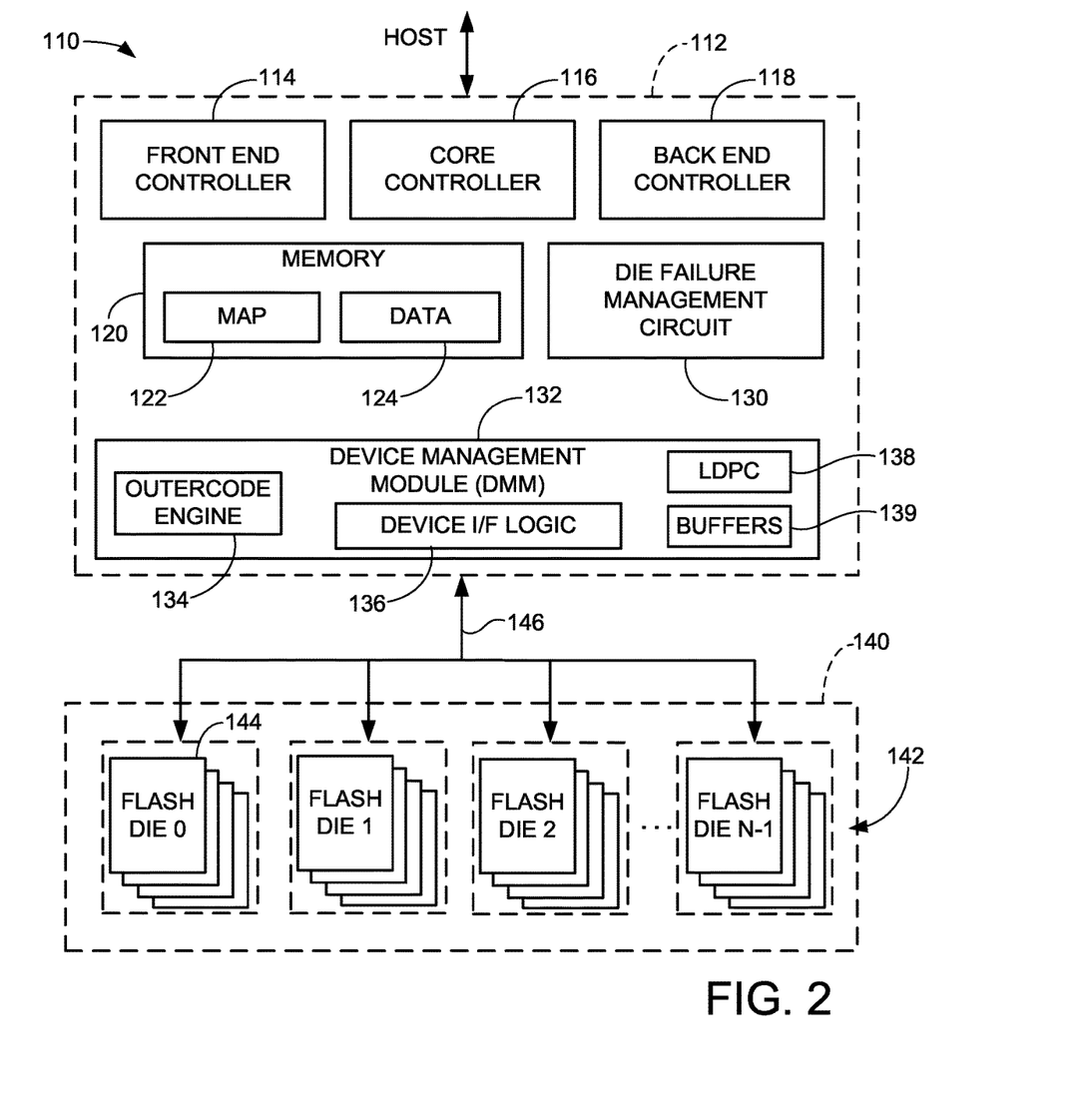
FIG. 2 shows aspects of the device of FIG. 1 characterized as a solid state drive (SSD) in accordance with some embodiments.

FIG. 2 shows a data storage device 110 as a particular embodiment of the device 100 in FIG. 1. The device 110 is configured as a solid state drive (SSD) that communicates with one or more client devices via one or more Peripheral Component Interface Express (PCIe) ports. The NVM is contemplated as comprising NAND flash memory, although other forms of solid state non-volatile memory can be used.

In at least some embodiments, the SSD operates in accordance with the NVMe (Non-Volatile Memory Express) Standard, which enables different users to allocate NVM sets (die sets) for use in the storage of data. Each die set may form a portion of an NVMe namespace that may span multiple SSDs or be contained within a single SSD.

The SSD 110 includes a controller circuit 112 that generally corresponds to the controller 106 of FIG. 1. The controller circuit 112 includes a front end controller 114, a core controller 116 and a back end controller 118. The front end controller 114 performs host I/F functions, the back end controller 118 directs data transfers with the memory module 114 and the core controller 116 provides top level control for the device.

Each controller 114, 116 and 118 includes a separate programmable processor with associated programming (e.g., firmware, FW) in a suitable memory location, as well as various hardware elements to execute data management and transfer functions. This is merely illustrative of one embodiment; in other embodiments, a single programmable processor (or less/more than three programmable processors) can be configured to carry out each of the front end, core and back end processes using associated FW in a suitable memory location. Multiple programmable processors can be used in each of these operative unites. A pure hardware based controller configuration can alternatively be used. The various controllers may be integrated into a single system on chip (SOC) integrated circuit device, or may be distributed among various discrete devices as required.

A controller memory 120 represents various forms of volatile and/or non-volatile memory (e.g., SRAM, DDR DRAM, flash, etc.) utilized as local memory by the controller 112. Various data structures and data sets may be stored by the memory including one or more metadata map structures 122 and one or more sets of user data 124 that are cached or buffered during data transfers with a client (e.g., 101, FIG. 1). A die failure management circuit 130 manages the failures predicted and/or experienced by the SSD 110 as described below.

A device management module (DMM) 132 supports back end processing operations. The DMM 132 includes an outer code engine circuit 134 to generate outer code, a device I/F logic circuit 136 to provide data communications, and a low density parity check (LDPC) circuit 138 configured to generate LDPC codes as part of an error detection and correction strategy used to protect the data stored by the by SSD 110. One or more buffers 139 are additionally incorporated to temporarily store and accumulate data during data transfer operations.

A memory module 140 corresponds to the memory 108 in FIG. 1 and includes an NVM in the form of a flash memory 142 distributed across a plural number N of flash memory dies 144. Rudimentary flash memory control electronics (not separately shown in FIG. 2) may be provisioned on each die 144 to facilitate parallel data transfer operations via a number of channels (lanes) 146.

Figure 3:
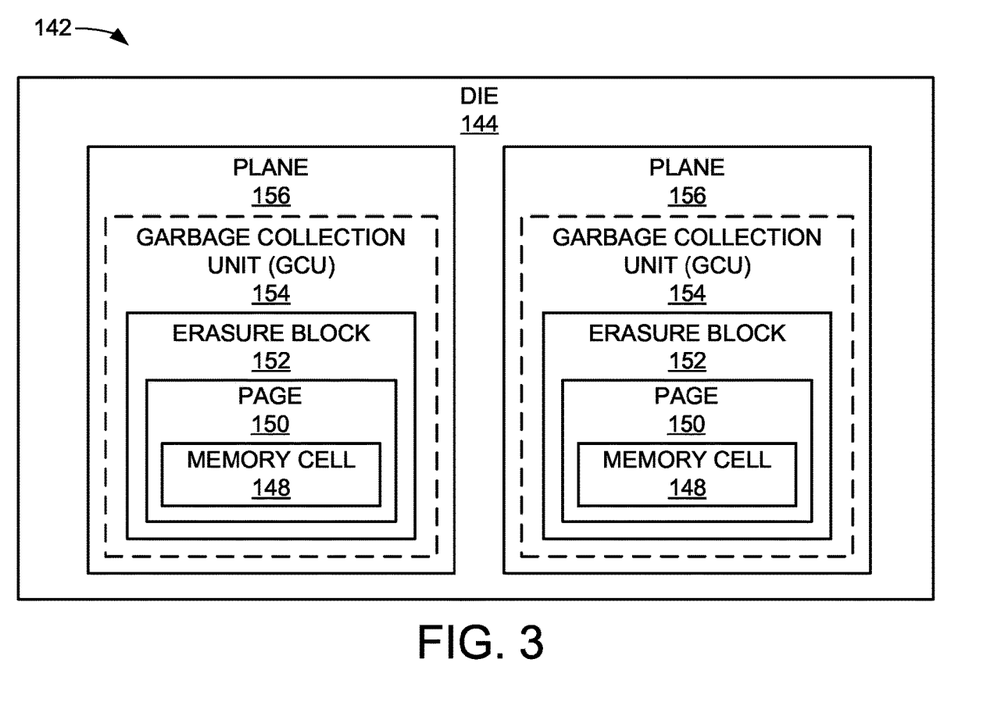
FIG. 3 shows an arrangement of the flash memory of FIG. 2 in some embodiments.

FIG. 3 shows a physical/logical arrangement of the various flash memory dies 144 in the flash memory 142 of FIG. 2 in some embodiments. Each die 144 incorporates a large number of flash memory cells 148. The cells may be arrayed in a two-dimensional (2D) or three-dimensional (3D stacked) arrangement with various control lines (e.g., source, bit, word lines) to access the cells.

Groups of cells 148 are interconnected to a common word line to accommodate pages 150, which represent the smallest unit of data that can be accessed at a time. Depending on the storage scheme, multiple pages of data may be written to the same physical row of cells, such as in the case of MLCs (multi-level cells), TLCs (three-level cells), XLCs (four-level cells), and so on. Generally, n bits of data can be stored to a particular memory cell 148 using Ti different charge states (e.g., TLCs use eight distinct charge levels to represent three bits of data, etc.). The storage size of a page can vary; some current generation flash memory pages are arranged to store 32 KB (32,768 bytes) of user data.

The memory cells 148 associated with a number of pages are integrated into an erasure block 152, which represents the smallest grouping of memory cells that can be concurrently erased in a NAND flash memory. A number of erasure blocks 152 are in turn incorporated into a GCU 154, which are logical storage units that utilize erasure blocks across different dies. GCUs are allocated and erased as a unit.

During operation, a selected GCU is allocated for the storage of user data, and this continues until the GCU is filled. Once a sufficient amount of the stored data is determined to be stale (e.g., no longer the most current version), a garbage collection operation can be carried out to recycle the GCU. This includes identifying and relocating the current version data to a new location, followed by an erasure operation to reset the memory cells to an erased (unprogrammed) state. The recycled GCU is returned to an allocation pool for subsequent allocation to begin storing new user data. In one embodiment, each GCU 154 nominally uses a single erasure block 152 from each of a plurality of dies 144, such as 32 dies.

Each die 144 may further be organized as a plurality of planes 156. Examples include two planes per die as shown in FIG. 3, although other numbers of planes per die, such as four planes per die, etc. can be used. Generally, a plane is a subdivision of the die 144 arranged with separate read/write/erase circuitry such that a given type of access operation (such as a write operation, etc.) can be carried out simultaneously by each of the planes to a common page address within the respective planes.

Figure 4:
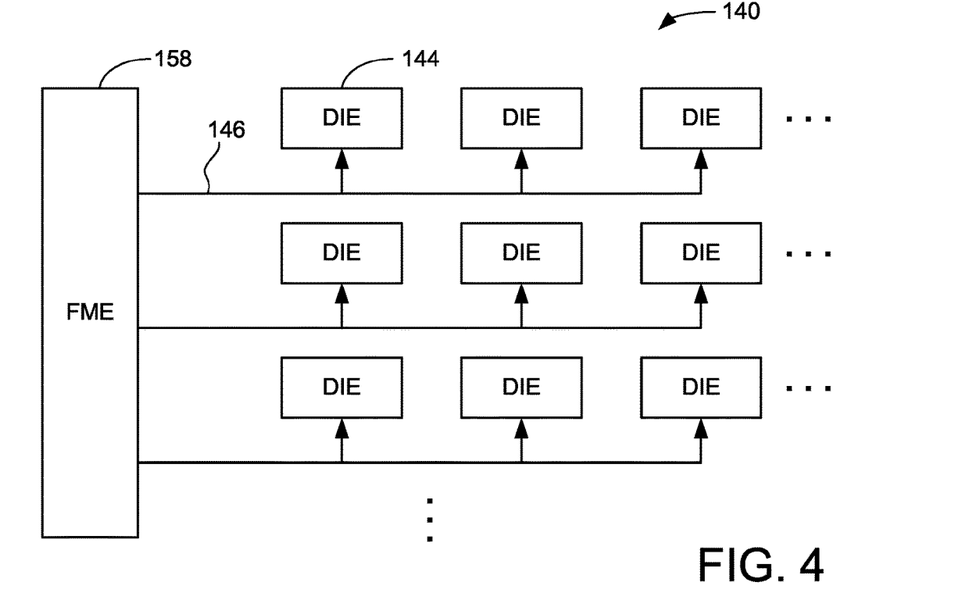
FIG. 4 shows an arrangements of the dies of the flash memory in conjunction with flash memory electronics (FME) that can be used to direct data transfer operations with the dies.

FIG. 4 shows the flash memory to incorporate a flash memory electronics (FME) unit 158 which serves as a rudimentary front end processor for the flash array. Coupled to the FME 158 are a plurality of the flash semiconductor dies 144 from FIG. 3 via the channels (lanes) 146 from FIG. 2. For reference, all of the dies coupled to a selected channel are referred to herein as a die set. Each die set is connected to a common channel line. The channels 146 allow different dies to be accessed in parallel, although normally only one die from each die set can be accessed at a time. User data sets and map metadata sets can be distributed across the flash memory 140 as desired. Distributing GCUs 154 (FIG. 3) across different die sets can enhance the ability to transfer data sets through parallel transfer operations along the respective channels.

Figure 5:
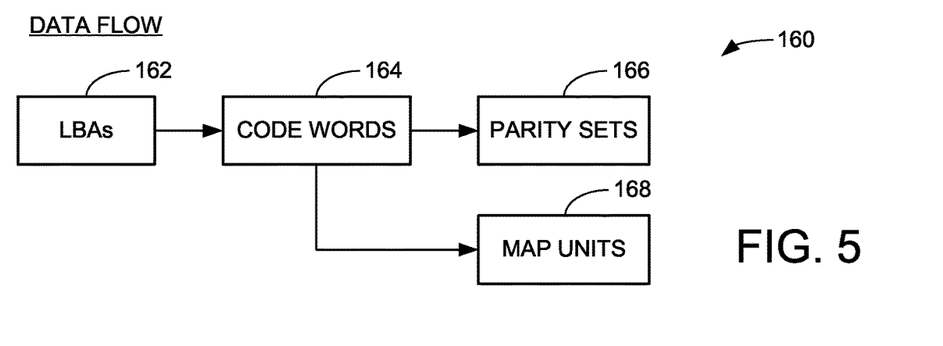
FIG. 5 illustrates a data flow of the SSD of FIG. 2.

FIG. 5 provides a data flow sequence 160 to describe the processing of input user data from a client device such as 102 in FIG. 1. Other arrangements can be used. User data blocks with associated logical addresses are represented at 162. The logical addresses may be logical block addresses (LBAs), but other forms can be used including key values, virtual block addresses, etc. Prior to storage in the flash memory 140, the blocks are arranged into code words 164, which include user data bits and error correction code (ECC) bits to facilitate recovery during a read operation. The ECC bits may take the form of LDPC (low density parity check) bits.

A selected number of the code words may be arranged into pages, and a selected number of pages may in turn be arranged into parity sets 166. In one non-limiting example, 31 pages of code words are combined such as through an exclusive-or (XOR) operation to generate a parity value as a $32^{nd}$ page, and then all 32 pages of the parity set is written to a selected GCU. The parity value operates as outer code. Using a normal GCU size of 32 erasure blocks with one erasure block from each die, the outer code can facilitate data recovery even in the instance of a single die failure. This will be recognized as being analogous to a RAID 5 configuration, where RAID stands for redundant array of independent discs/devices. Other RAID configurations can be employed to configure the GCUs as desired, such as but not limited to RAID 6, RAID 7, etc.

The parity sets 166 are transferred for storage by the flash in the selected GCU. For mapping purposes, groups of the code words 164 are further arranged into map units 168. Map units represents groupings that enable the mapping system of the SSD to locate and retrieve the code words stored to the flash memory 140.

Figure 6:
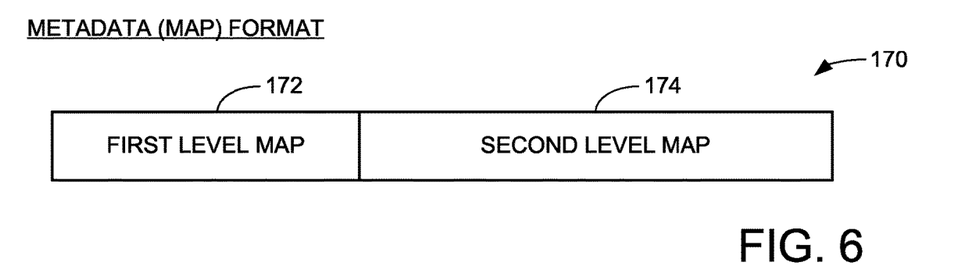
FIG. 6 is a format for metadata used by the SSD arranged as a two-level map.

FIG. 6 shows the map metadata to be arranged as a two level map 170. Other mapping structures can be used including a single level map, a multi-level map with more than two levels, etc. The map 170 includes a first level map 172 and a second level map 174.

The second level map 174 provides second level map entries that operate as a flash transition layer (FTL) with a physical to logical association of addresses to enable location of the desired user data blocks via the map units 168. The first level map 172 provides first level map entries that identify the locations of the second level entries.

Figure 7:
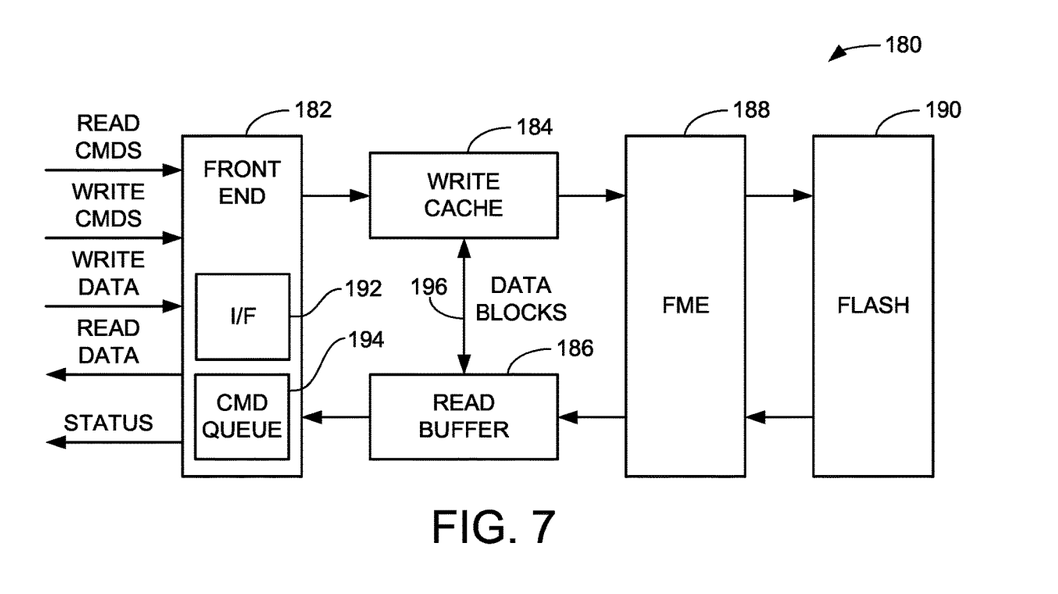
FIG. 7 shows data path circuitry of another SSD in some embodiments.

FIG. 7 shows provides a functional block representation of an SSD 180 similar to the SSD 110 of FIG. 2 to illustrate various data paths that can be used to store and retrieve data from a client device such as the device 102 in FIG. 1. FIG. 7 includes a front end 182, a write cache 184, a read buffer 186, flash memory electronics (FME) 188, and flash memory 190. The front end 182 interfaces with one or more client devices using an interface (I/F) circuit 192. Pending access commands are stored in one or more command queues 194.

During normal operation of the SSD 180, the client(s) will issue various access commands including read and write commands. Each read command will constitute a request for some logical range (e.g., LBA range) of blocks to be retrieved from flash 190. Each write command will constitute a request to store some logical range of blocks to the flash, and will be accompanied by a transfer of the associated writeback data.

The front end 182 processes these and other commands and arranges the respective read and write commands into one or more of the command queues 184 pending execution. The writeback data are stored in the write cache 184 and are subjected to processing as described above to arrange the writeback data into code words, pages, parity sets, etc. Additional processing may be applied as well, such as encryption and compression.

At such time that a command scheduler (not separately shown) of the SSD controller (not separately shown) selects the next command to be serviced, the associated command/data are forwarded to the FME 188, which in turn directs the same to the flash 190. In the case of a write command, the writeback data are written to the next set of available pages in an allocated GCU (e.g., 154, FIG. 3). In the case of a read command, the data are retrieved, subjected to error correction and other signal processing steps, and placed in the read buffer. The map metadata are accessed and updated as required during these operations.

The front end 182 provides various statuses to the client, including command complete statuses when commands are completed. For completed read commands, the command complete status may indicate that the requested readback data have been successfully retrieved and are now available for transfer from the read buffer 186. If writeback caching techniques are employed, the front end 182 may proceed to issue a write command complete status to the client, even if the writeback data are still pending in the write cache 184 and have not yet been written to the flash 190. To this end, the write cache 184 may take the form of NVM, such as NAND or NOR flash, although such is not necessarily required. The read cache 186 may normally be volatile memory, such as DRAM, since the readback data in the read cache can always be re-read from the non-volatile flash if required. Internal transfers of data blocks may occur at selected times between the write cache and the read buffer, as depicted by arrow 196.

Figure 8:
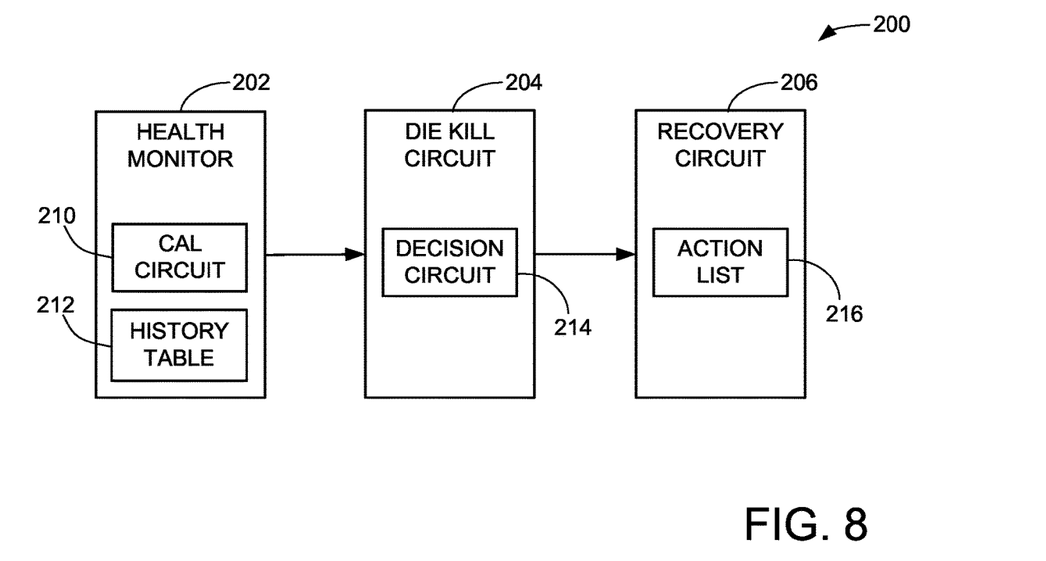
FIG. 8 is a functional block representation of die failure management circuitry of the SSD of FIGS. 2 and 7 in some embodiments.

FIG. 8 depicts a die failure management circuit 200, generally corresponding to the circuit 130 in FIG. 2. The circuit 200 includes a health monitor circuit 202, a die kill circuit 204 and a recovery circuit 206. As noted above, these various circuits can be realized using programmable processor(s) and/or hardware circuits as required.

The health monitor circuit 202 monitors the ongoing health, or status, of the various elements of the associated flash memory (e.g., 140, FIG. 2; 190, FIG. 7). This can include calibration operations, as indicated by calibration circuit 210, which operates to carry out periodic read voltage and other system checks upon the various memory elements. The calibration circuit can perform other monitoring operations as well, such as measuring error rates (BER), recovery efforts, etc. to detect regions with anomalous performance. A history table 212 can be used to accumulate parametric information regarding the status of the memory in order to enable failure trends to be detected.

The die kill circuit 204 operates to make an affirmative decision, via a decision circuit 214, to retire, or kill, a given die within the system. The decision may be proactive, such as in the case where continued degraded performance of sufficient blocks on the die warrants removal of the die from further service, or the decision may be reactive, such as in the case of a catastrophic failure which requires removal of the die.

The recovery circuit 206 takes affirmative steps to reconfigure the flash memory as a result of the removal of the failed die from service. A number of alternatives are contemplated. These can include prioritizing recovery reads over other forms of read/write activity, deactivating proactive actions involving the die, changing buffer destinations for recovery operations, reverting to previous reads, and setting a priority scheme to prevent or reduce re-reads while ensuring highest priority data are recovered first. These actions are selected and enacted from an action list 216, which is used to establish the recovery sequence.

The circuit 206 intelligently selects and activates various operations to allow the storage device controller to adapt the die kill and recovery sequence to the conditions and status at hand, thereby increasing efficiency without sacrificing data storage performance of the system.

Figure 9:
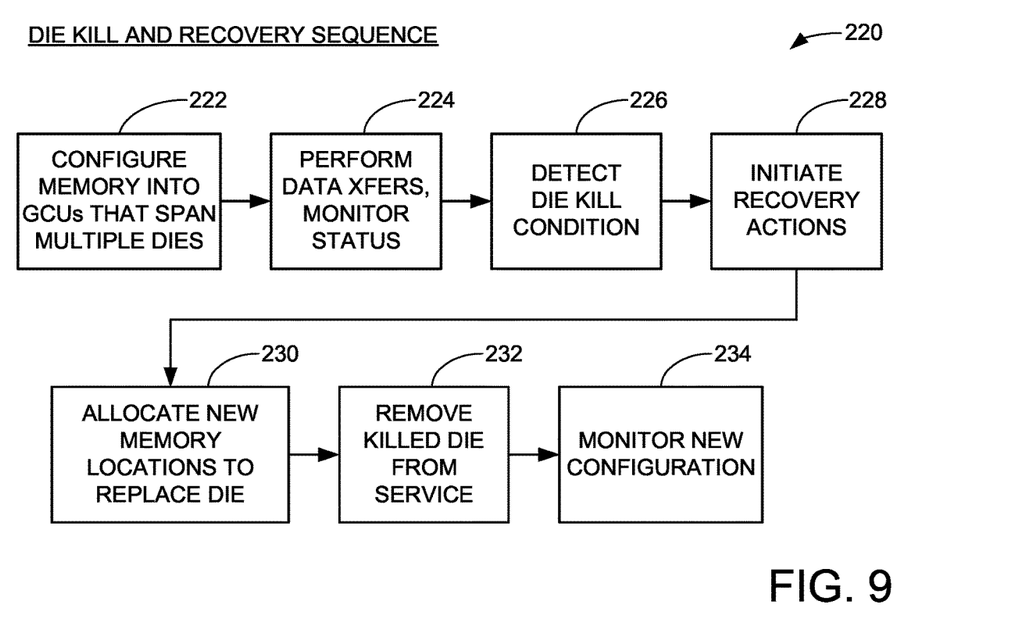
FIG. 9 is a sequence diagram to illustrate steps carried out during a die kill and recovery sequence of the SSD in some embodiments.

FIG. 9 shows a die kill and recovery sequence 220 carried out by the circuit 200 of FIG. 8 in some embodiments. At block 222, a semiconductor based NVM such as the flash memory presented above is configured into a series of GCUs, each GCU using one or more blocks of memory across multiple dies of the NVM. In one non-limiting example, one or more erasure blocks from each of a plural number M dies make up each GCU, such as thirty-two dies (M=32). The GCUs can be staggered across the various dies and channels to provide level loaded performance capabilities.

Data transfer operations are thereafter commenced at block 224, in which parity sets of data are generated and stored to the various GCUs as described above responsive to various client (host) commands and internal background commands. The background commands can include read calibrations, data relocations, metadata map updates, garbage collection operations, etc. Various system parameters are monitored during continued operation of the memory.

A die kill condition is detected at block 226. As noted above, this may be determined based on degraded performance of the die, or may be declared responsive to sufficient failed or decommissioned blocks in the die. As such, recovery actions are initiated at block 228 to recover the data that can be retrieved from the die, as well as to reconfigure the system to account for the subsequent removal of the die from service.

One or more new memory locations may be allocated at block 230 to accommodate the retrieved data. Once the killed die is finally decommissioned and removed from service, block 232, the system resumes normal operation and the new configuration is monitored, block 234.

Figure 10:
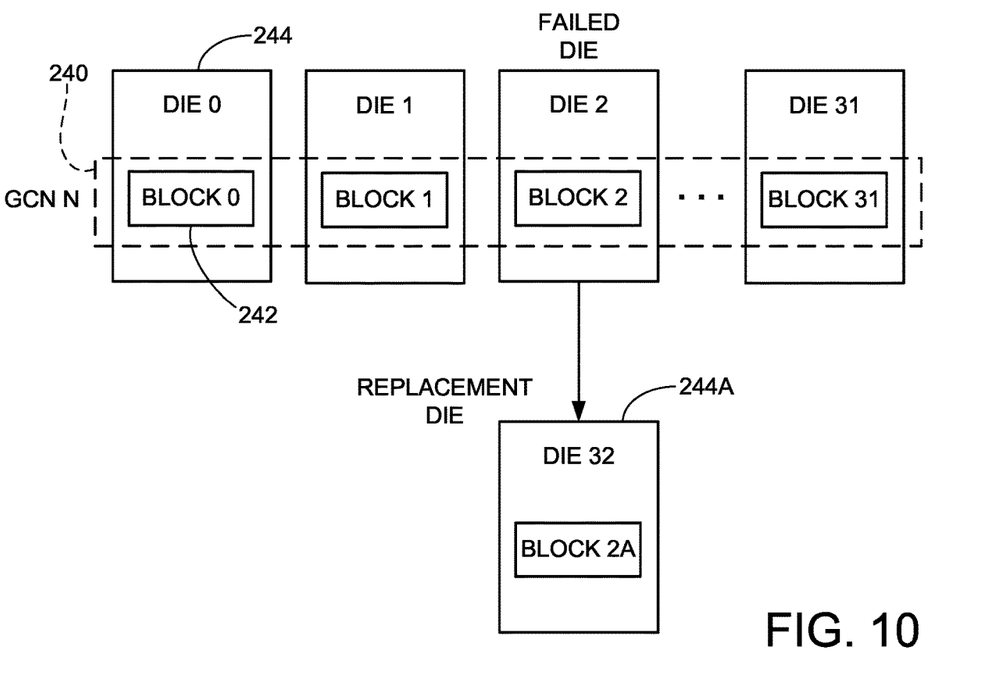
FIG. 10 shows a reconfiguration of the memory of the SSD during the sequence of FIG. 9.

FIG. 10 shows an example GCU 240, denoted as GCU N, to illustrate aspects of the sequence of FIG. 9. The GCU 240 uses a single erasure block 242 from each of 32 dies 244, with the dies arbitrarily denoted as Dies 0-31. It is contemplated that Die 2 is subjected to kill processing. In some embodiments, a new, replacement die (Die 32), denoted at 244A, is substituted for the failed die. This maintains the total number of dies in the GCU 240 at 32 dies. The replacement die 244A can be selected from the same die group as the failed die, or can be located elsewhere in the system. In this case, recoverable data from Block 2 in failed Die 2 can be reconstructed and placed in new Block 2A of Die 32.

In other embodiments, the retrieved data can be consolidated into other locations, and GCU N can be reduced to a total of 31 dies (so that the killed die is not replaced). In still other embodiments, an entirely new set of different dies can be selected to relocate the existing GCUs, including new combinations so that the remaining active dies (e.g., Dies 0-1 and 3-31) are distributed among new GCUs (e.g., a new GCU P may use Dies 0 and 1, but none of the remaining Dies 3-31; a new GCU R may use Dies 6-7 and 31, and so on).

Figure 11:
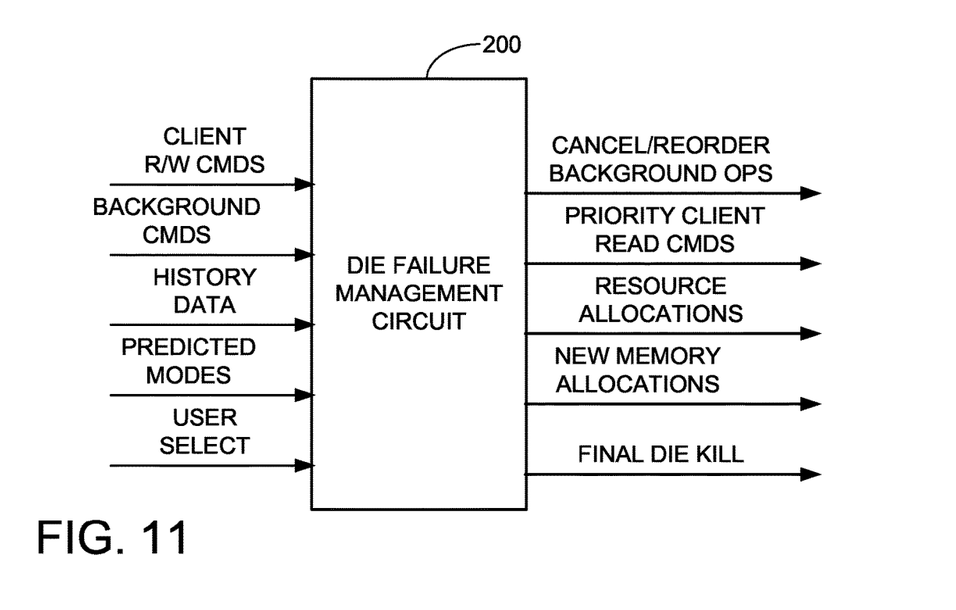
FIG. 11 shows various inputs and outputs used during the sequence of FIG. 9.

The intelligent selection and activation of the various actions by the circuit 200 are further discussed in FIG. 11. As will be appreciated, depending upon the operational environment many tens, hundreds or thousands of pending commands may be processed by the SSD using the various queues and data paths described above in FIG. 7. Not all of the commands may necessarily require access to the failed Die 2, so part of the recovery operation includes prioritizing existing operations to continue to maintain specified levels of read/write processing at the client level.

Some routine background operations may be suspended temporarily in favor of the recovery operations necessary to resolve the kill die situation. Similarly, any previously scheduled background operations involving Die 2 (with or without other dies as well in the same GCU grouping) may be temporarily suspended.

As shown in FIG. 11, various inputs that can be used by the circuit 200 include access to pending client commands, pending background commands, history statistics, and predicted actions that may influence the ordering of the recovery operation. Outputs include changes to background commands involving the failed die, the performance of recovery reads to recover current version data from die 2, and the allocation, as necessary, of new memory locations to accommodate removal of the failed die from the system. In some cases, a partial or full garbage collection operation can be scheduled upon GCU N (as well as any other GCUs that incorporate the failed die) in order to efficiently recover the current version data. However, a more selective process whereby hottest data are recovered and relocated first may be more appropriate in order to maintain current system performance levels. In some cases, the owners (users) that have data stored in the failed die can be notified and user inputs can be provided as to which data may have priority; this can also allow the user to access a replicated version of the data from another location while the failed die is processed.

Outputs by the die failure management circuit include cancellation and reordering of new background operations; the issuance of priority client commands; the allocation of different resources (e.g., buffers, decoders, etc.) to process the recovered data; allocation of new memory locations (such as the replacement die 244A in FIG. 10); and the final deactivation of the failed die. Suitable ordering of these steps is carried out to maintain existing levels of client data transfer rate performance. In some cases, raw data with code words (e.g., FIG. 5) can be used to separate host (client) reads from background reads. The system can be adaptive so that once a recovery sequence is established, the various steps can be ignored, skipped or reordered as necessary to maintain client I/O performance at acceptable levels.

While the various embodiments have been described in terms of an SSD, other types of storage devices and operational environments can be used as desired. Flash memory is a particularly suitable NVM, but other forms of data storage memory can be used.

It is to be understood that even though numerous characteristics and advantages of various embodiments of the present disclosure have been set forth in the foregoing description, together with details of the structure and function of various embodiments of the disclosure, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A method comprising:
storing user data from a client device in garbage collection units (GCUs) that span multiple semiconductor dies in a non-volatile memory (NVM);
detecting a die failure event associated with a selected die;
selecting recovery actions to be taken in a selected sequence to maintain a current level of data transfer performance with the client device;
executing the selected recovery actions in the selected sequence to transfer at least a portion of the user data stored in the selected die to a new replacement die the selected recovery actions comprising notifying a user associated with the selected die of the detected die failure event and prioritizing the reading of data from the selected die responsive to a priority ordering input supplied by the user; and
decommissioning the selected die.

2. The method of claim 1, wherein the selected recovery actions further comprise cancelling a scheduled background operation upon the selected die.

3. The method of claim 2, wherein the selected recovery actions further include a garbage collection operation in which current version data in the selected die are copied to the new replacement die.

4. The method of claim 1, wherein the die failure event is detected responsive to error data associated with the selected die obtained during the execution of client data transfer commands to a selected GCU that includes the selected die.

5. The method of claim 1, wherein the selected recovery actions further comprise allocating at least one buffer to support a data transfer operation with the selected die, the at least one buffer previously scheduled for use with a different die not associated with the selected die.

6. The method of claim 1, wherein the selected recovery actions further comprise configuring a read from a buffer memory to eliminate a need to perform a re-read of data from the selected die.

7. The method of claim 1, wherein the NVM is a flash memory, the dies are flash memory dies arranged in die sets, and each die set is coupled via a common channel path to a flash memory electronics (FME) front end module of the flash memory.

8. The method of claim 7, wherein the selected die and the replacement die are arranged in the same die set and are coupled to the same common channel path.

9. The method of claim 7, wherein the selected die is in a first die set coupled to a first common channel path and the replacement die is in a different, second die set coupled to a different, second common channel path.

10. The method of claim 1, wherein the selected recovery actions further comprise retrieving map metadata from the selected die as well as user data from the selected die.

11. The method of claim 1, wherein the user data stored to the GCUs are arranged as parity data sets written to N dies, where each parity set comprises code words written to N-1 of the dies and an outer code parity value written to the remaining die.

12. An apparatus comprising:
a non-volatile memory (NVM) arranged as a plurality of semiconductor dies;
a controller circuit configured to transfer data from a client device to the NVM in garbage collection units (GCUs) each allocated and erased as a unit and each spanning a selected set of the dies; and
a die failure management circuit configured to detect a die failure event associated with a selected die responsive to history data accumulated by the die failure management circuit over a period of time, select recovery actions to be taken in a selected sequence to maintain a current level of data transfer performance with the client device, execute the selected recovery actions in the selected sequence to transfer at least a portion of the user data stored in the selected die to a new replacement die, and decommission the selected die.

13. The apparatus of claim 12, wherein the recovery actions in the selected sequence comprise at least one of the following actions: cancellation of a scheduled background operation upon the selected die, a garbage collection operation in which current version data in the selected die are copied to the new replacement die, allocating at least one buffer to support a data transfer operation with the selected die with the at least one buffer previously scheduled for use with a different die not associated with the selected die, and performing a read from cached data in a buffer memory to eliminate a need to perform a re-read of data from the selected die, and notification of a user associated with the selected die of the detected die failure event and prioritizing the reading of data from the selected die responsive to a priority ordering input supplied by the user.

14. The apparatus of claim 12, characterized as a solid-state drive (SSD), wherein the NVM is a flash memory, the dies are flash memory dies arranged in die sets, and each die set is coupled via a common channel path to a flash memory electronics (FME) front end module of the flash memory.

15. The apparatus of claim 14, wherein the selected die and the replacement die are arranged in the same die set and are coupled to the same common channel path.

16. The apparatus of claim 14, wherein the selected die is in a first die set coupled to a first common channel path and the replacement die is in a different, second die set coupled to a different, second common channel path.

17. The apparatus of claim 12, wherein the die failure management circuit cancels a previously scheduled background operation on another location within the NVM to support the recovery of the data from the selected die.

18. A method comprising:
storing user data from a client device in garbage collection units (GCUs) that span multiple semiconductor dies in a non-volatile memory (NVM);

detecting a die failure event associated with a selected die;

selecting recovery actions to be carried out to transfer at least a portion of the user data stored on the selected die to an available die, the recovery actions arranged for execution in a selected sequence to maintain a selected level of data transfer performance with the client device during decommissioning of the selected die;

executing a first portion of the selected recovery actions in the selected sequence; and executing a remaining second portion of the selected recovery actions in a reordered, different sequence to maintain the selected level of data transfer performance with the client device.

19. The method of claim 18, further comprising using code words to separate client commands from background commands during execution of the selected recovery actions.

20. The method of claim 18, wherein a selected one of the selected recovery actions comprises cancelling a previously scheduled background operation on another location within the NVM to support the transfer of the user data stored on the selected die to the available die.

* * * * *